(12) United States Patent
Leveen

(10) Patent No.: US 12,428,296 B1
(45) Date of Patent: Sep. 30, 2025

(54) PROCESS FOR GENERATING CLEAN POWER AND HYDROGEN

(71) Applicant: Nucor Corporation, Charlotte, NC (US)

(72) Inventor: Lindsay Leveen, Sausalito, CA (US)

(73) Assignee: Nucor Corporation, Charlotte, NC (US)

( * ) Notice: Subject to any disclaimer, the term of this patent is extended or adjusted under 35 U.S.C. 154(b) by 0 days.

(21) Appl. No.: 19/204,018

(22) Filed: May 9, 2025

Related U.S. Application Data

(60) Provisional application No. 63/645,594, filed on May 10, 2024.

(51) Int. Cl.
| | | |
|---|---|---|
| *C01B 3/36* | (2006.01) | |
| *B01D 53/62* | (2006.01) | |
| *B01D 53/76* | (2006.01) | |
| *C01B 32/50* | (2017.01) | |
| *F02G 1/02* | (2006.01) | |

(52) U.S. Cl.
CPC ............. *C01B 3/36* (2013.01); *B01D 53/62* (2013.01); *B01D 53/76* (2013.01); *C01B 32/50* (2017.08); *F02G 1/02* (2013.01); *B01D 2256/16* (2013.01); *B01D 2257/502* (2013.01); *C01B 2203/0255* (2013.01); *C01B 2203/1235* (2013.01); *C01B 2203/84* (2013.01); *C01B 2203/86* (2013.01)

(58) Field of Classification Search
CPC ....... C01B 3/36; C01B 32/50; C01B 2203/86; B01D 53/62; B01D 53/76; B01D 2257/502; F02G 1/02
See application file for complete search history.

(56) References Cited

U.S. PATENT DOCUMENTS

| | | |
|---|---|---|
| 6,877,322 B2 | 4/2005 | Fan |
| 7,066,984 B2 | 6/2006 | Dunn |
| 7,988,948 B2 | 8/2011 | Guvelioglu et al. |
| 8,137,422 B2 | 3/2012 | Licht et al. |
| 8,776,532 B2 | 7/2014 | Allam et al. |
| 10,180,253 B2 | 1/2019 | Lee et al. |
| 11,149,636 B2 | 10/2021 | Callahan |
| 11,859,517 B2 | 1/2024 | Lu et al. |
| 11,994,063 B2 | 5/2024 | Callahan |
| 12,264,620 B2 | 4/2025 | Leveen |
| 2004/0123601 A1 | 7/2004 | Fan |

(Continued)

FOREIGN PATENT DOCUMENTS

| | | |
|---|---|---|
| EP | 2233430 A1 | 9/2010 |
| WO | 2021250083 A1 | 12/2021 |

OTHER PUBLICATIONS

Wagman, David; "This Power Plant Runs on CO2," Spectrum IEEE, 2018, 17 Pages—https://spectrum.ieee.org/this-power-plant-runs-on-co2.

(Continued)

*Primary Examiner* — Shafiq Mian
(74) *Attorney, Agent, or Firm* — Christopher J. Knors; Moore & Van Allen PLLC

(57) ABSTRACT

Systems and systems to generate clean energy and for providing hydrogen capture and carbon capture sequestration are provided. Heat from partial oxidation of hydrocarbon fuel is used to generate clean power via one or more heat engines together with hydrogen capture and carbon capture sequestration.

17 Claims, 2 Drawing Sheets

(56) References Cited

U.S. PATENT DOCUMENTS

| | | |
|---|---|---|
| 2005/0066813 A1 | 3/2005 | Dunn |
| 2015/0308676 A1 | 10/2015 | Lee et al. |
| 2018/0128172 A1 | 5/2018 | Allam |
| 2019/0211715 A1 | 7/2019 | Park et al. |
| 2022/0099003 A1* | 3/2022 | Lu .............................. F01K 7/16 |
| 2023/0219816 A1 | 7/2023 | Goswami et al. |
| 2023/0340914 A1* | 10/2023 | Callahan ................... F02C 3/22 |
| 2023/0340919 A1* | 10/2023 | Mercal .................. F02B 75/047 |

OTHER PUBLICATIONS

European Patent Office; International Search Report & Written Opinion for International Patent Application No. PCT/US2024/026283 dated Sep. 11, 2024, 14 Pages.

Nucor Corporation; U.S. Appl. No. 19/095,741, filed Mar. 31, 2025.

* cited by examiner

PROCESS FOR GENERATING CLEAN POWER AND HYDROGEN

CROSS-REFERENCE TO RELATED APPLICATIONS

This application claims the benefit of U.S. Provisional Application No. 63/645,594 filed on May 10, 2024, the entirety of each of which is incorporated herein by reference.

TECHNICAL FIELD

This disclosure is directed to methods and systems to generate clean energy and for providing hydrogen capture and carbon capture sequestration. In one example, heat generated from the partially oxidization of hydrocarbon fuel is converted to power using a heat engine. Clean hydrogen separated from the partially oxidized hydrocarbon fuel is captured or stored. Carbon monoxide from the partially oxidized hydrocarbon fuel is further oxidized to carbon dioxide and sequestered.

BACKGROUND

Nearly all fossil fuel-burning power plants globally release at least a portion of their carbon emissions directly into the atmosphere. In some advances in this field, combusted natural gas emissions are captured and concentrated for carbon capture sequestering (CCS). In previous attempts the economics of CCS have been unsuccessful in balancing power cycles with the expensive of efficiency-reducing equipment to carry out CCS.

Nonetheless, the above power generating processes exploit the full combustion/oxidation of the carbon-based/hydrocarbon fuel, essentially using an equal or excess stochiometric amount of oxygen to oxidize the hydrocarbon to carbon dioxide ($CO_2$) and water without the intentional generation and capture of valuable hydrogen ($H_2$).

SUMMARY

In one example, a method for generating clean energy is provided, the method comprising partially oxidizing a hydrocarbon fuel and providing a partially oxidized gas stream, the partially combusted gas stream comprising a volume quantity of hydrogen and a heat content, introducing the partially combusted gas stream to a heat engine, and generating an amount of clean energy from at least a portion of the heat content.

In another example, a system for generating clean energy is provided, the system comprising a partial oxidation unit (POX) configured to partially oxidize a hydrocarbon fuel and provide a partially oxidized gas stream comprising a volume amount of hydrogen and an amount of carbon monoxide (CO) therefrom, and a heat engine operably coupled to the partial oxidation unit, the heat engine configured to receive a heat content from the partially oxidized gas stream and to generate an amount of energy proportional to the heat content received from the partially oxidized gas stream.

In another example, a method of generating power is provided, the method comprising the steps of partially oxidizing a hydrocarbon fuel with O2 (oxygen) to provide a partially oxidized product stream comprising H2 (hydrogen), CO (carbon monoxide), water with trace amounts of CO2 (carbon dioxide), the partially oxidized product stream having a heat content, introducing the partially oxidized gas stream to at least one heat engine, and generating power from the heat engine using at least some of the heat content from the partially oxidizing gas stream.

BRIEF DESCRIPTION OF THE DRAWINGS

In order to understand and to visualize how the present disclosure may be carried out in practice, examples will now be described, by way of non-limiting examples only, with reference to the accompanying drawings, in which.

DETAILED DESCRIPTION

Figure 1:
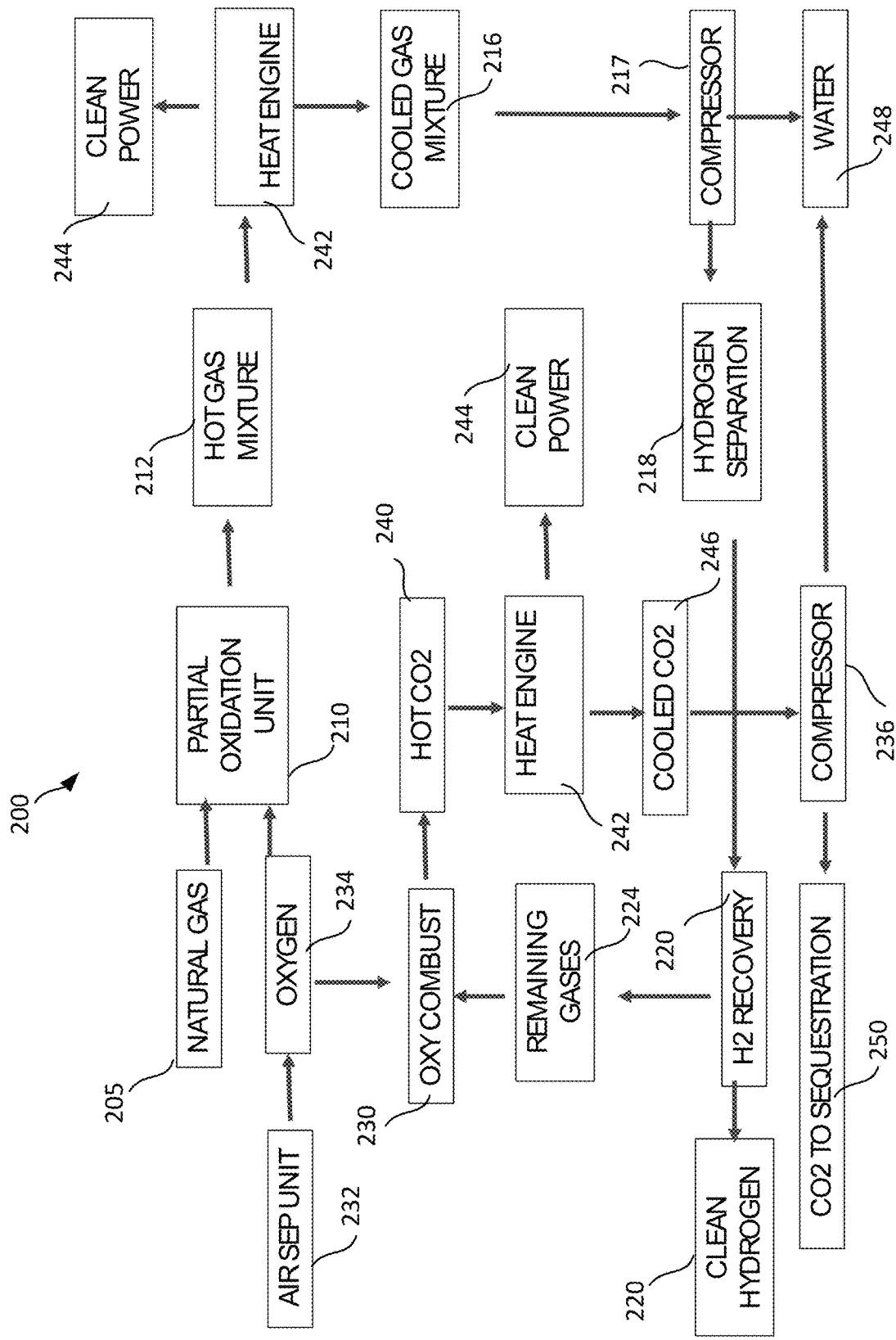
FIG. 1 is a schematic flow diagram of the presently disclosed method and system.

As used herein, the term "bar-g" is inclusive of its ordinary and customary meaning, for example, a unit of pressure given by absolute pressure minus atmospheric pressure, i.e., gauge pressure.

As used herein, the phrase "essentially pure," or "essentially free" are inclusive of at least 50%, at least 55%, at least 60%, at least 65%, at least 70%, at least 75%, at least 80%, at least 85%, at least 90%, at least 91%, at least 92%, at least 93%, at least 94%, at least 95%, at least 96%, at least 97%, at least 98%, at least 99%, at least 99.5%, at least 99.9% free of other substances. In one example, "essentially pure," or "essentially free" is at least 95%, at least 96%, at least 97%, at least 98%, at least 99%, at least 99.5%, at least 99.9% free of other substances.

As used herein, the phrase "clean energy" and "clean power" are used interchangeably and are inclusive of methods and systems that reduce or substantially eliminate emission of carbon sources while producing energy while consuming a fuel. For example, reducing or eliminating sources of carbon dioxide emissions from energy production facilities, such as those that consume hydrocarbon fuels, provides clean energy.

As used herein, the term "rich" is inclusive of essentially pure or high concentrated relative to other material present. For example, a rich $CO_2$ stream is one that is at least 51%, or essentially 95, 96, 97, 98, 99 or greater in purity, as measured in parts per million, moles, volume, or weight percent.

As used herein, the term "combustion" is inclusive of its ordinary and customary meaning, for example, a chemical combination of a substance with oxygen, typically involving a production of an amount of heat.

As used herein, the phrase "partial combustion" or "partial oxidation" and their grammatical equivalents are used interchangeably herein and are inclusive of its ordinary and customary meaning, for example, an incomplete or non-stochiometric chemical combination of a substance with its molar equivalent of oxygen, for example, processes that use of oxygen and/or air, and combined, in less than stoichiometric amount, with a hydrocarbon or carbon-based fuel, so as to provide a reaction stream of partially oxidized hydrocarbon reaction products where the hydrogen present in the hydrocarbon present is not completely oxidized to water and the carbon present in the hydrocarbon fuel is not completely oxidized to carbon dioxide. For example, partial combustion of a hydrocarbon fuel provides a partial combustion stream including, for example, carbon monoxide, hydrogen, water and carbon dioxide.

As used herein, the phrases "partial oxidation unit", "partial combustion unit", "POX unit" or "PDX unit" are used interchangeably herein and are inclusive of their ordinary and customary meaning, for example, equipment or systems for carrying out partial combustion (oxidation) of a fuel, for example, a hydrocarbon fuel. Partial oxidation or partial combustion of a hydrocarbon fuel typically produces hydrogen, carbon monoxide, water, carbon dioxide, and low molecular weight hydrocarbons such as methane.

As used herein, the phrases "oxy-fuel combustion," and "oxy-combustion" are inclusive of its ordinary and customary meaning, for example, processes that use a pure source of oxygen and/or air stripped of other gases so as to be essentially pure oxygen, and combined, in an equal or stoichiometric excess of a hydrocarbon or carbon-based fuel, so as to provide a reaction stream of essentially pure carbon dioxide ($CO_2$) if a carbon-based source (i.e., carbon monoxide), along with water (if a hydrocarbon source).

As used herein, the phrase "oxy-combustor" is inclusive of its ordinary and customary meaning, for example, equipment or a system capable of performing oxy-fuel combustion, for example, of a hydrocarbon fuel.

As used herein, the phrase "carbon capture sequestration (CCS)" is inclusive of its ordinary and customary meaning, for example, equipment or a system capable of geological or biological sequestering carbon dioxide or continuous chemical conversion of carbon dioxide to non-greenhouse gases or products.

As used herein, the phrases "high pressure," or "high temperature" are inclusive of their ordinary and customary meaning, for example, pressures or temperatures above ambient by 2×, 10×, 100× or more above ambient temperature or pressure. In one example, "high pressure," or "high temperature" is ordinary and customary thermodynamic temperatures and pressures typically associated with the partial combustion or complete combustion of hydrocarbon fuels or carbon monoxide with oxygen.

As used herein, the phrases "heat engine," or "Stirling Cycle engine" are inclusive of its ordinary and customary meaning, for example, devices that use heat to expand a contained working fluid within a sealed cavity to reversibly move an assembly thru a magnetic field to create an electrical current. "Heat engine," or "Stirling Cycle engine" are inclusive of linear generators that produce electrical current. In one example, the heat is provided by the partial oxidation of a hydrocarbon fuel. In one example, heat to the heat engine is provided by presenting the reaction products (gaseous mixture) from the partial oxidation of a hydrocarbon fuel. In one example, heat to the heat engine is provided by presenting the reaction products (gaseous mixture) from the partial oxidation of a hydrocarbon fuel without cooling and/or separation.

Presently disclosed systems generate clean energy and provide hydrogen capture. In one example, the presently disclosed systems generate clean energy and provide hydrogen capture from the partial combustion of hydrocarbon fuel in combination with full combustion of carbon from the hydrocarbon fuel.

The presently disclosed method and system will eliminate the need for heat exchanging equipment to cool the reaction gases from the POX unit, as the heat engine will facilitate heat exchange and heat reduction of the reaction gases exiting the POX unit for further separation thereof while providing clean energy, thus, reducing costs.

The presently disclosed method and system will utilize heat exchanging equipment in the form of one or more heat engines to cool the reaction gases exiting from an oxy combustion unit. The heat engine will facilitate heat exchange and heat reduction of the exiting reaction gases for providing clean energy. In addition, the presently disclosed method and system provides for separating the cooled gas mixture exiting heat engine, providing a rich hydrogen stream and a CO rich stream and then and introducing this carbon monoxide rich stream together with pure oxygen into an additional heat engine so that oxy combustion (carbon monoxide+oxygen→carbon dioxide+heat) occurs in the heat engine to facilitate heat to energy conversion, thus eliminating the need for a separate oxy-combustion unit.

In one example, the presently disclosed method and system will result in essentially all the carbon in the hydrocarbon fuel being fully oxidized providing stochiometric amounts of $CO_2$ that is then compressed, dried, and transported and/or sequestered.

In one example, a POX unit using about 300 US tons per day of oxygen and about 10 million standard cubic feet a day of natural gas will produce about 33 metric tons a day of clean hydrogen and 16 net megawatts of net export power. Coupled to one or more heat engines, about 31 megawatts of heat engine output is feasible.

With regard to the additional system that further includes an oxy combustor, an additional amount of about 250 US tons a day of oxygen for the conversion of CO to $CO_2$ is used. Approximately 15 megawatts of power is consumed by the air separation unit (ASU, the hydrogen separation, and the $CO_2$ compression/sequestration.

In one example, as the amount of oxygen combined with the natural gas introduced to the partial oxidation unit is below a stoichiometric amount of that of the hydrocarbon fuel, e.g. natural gas, a large portion of the hydrogen present in the natural gas entering the partial oxidation unit is converted to hydrogen rather than water, as would otherwise be the case with complete oxidation of the natural gas. Under these non-stoichiometric conditions, approximately 70-90 mole percent, or about 75-85 mole percent, or about 80 mole percent of the hydrogen present in the natural gas is converted to hydrogen, with the remainder of the hydrogen from the natural gas being present in water.

In one aspect, the present disclosure provides for the collection and/or storage of this hydrogen that is derived from the hydrocarbon fuel stream introduced into the partial oxidation unit. The present disclosure further provides for the collection and/or storage of essentially pure hydrogen that is derived from the hydrocarbon fuel stream introduced into the partial oxidation unit by subsequently separating the hydrogen from carbon monoxide, and water in the partially combusted product stream. Essentially pure hydrogen is inclusive of hydrogen that is 95 wt. %, 96 wt. %, 97 wt. %, 98 wt. %, 99 wt. %, 99.5 wt. % or greater in purity.

The present disclosure further provides for the collection and/or storage of essentially pure hydrogen that is derived from the resultant oxidation of the natural gas fuel stream introduced into the partial oxidation unit, after the generated heat stored in the totality of the partially oxidized product stream is utilized in the heat engine and before the hydrogen is subsequently separated from carbon monoxide and water in the partially oxidized product stream.

Thus, in one example, a method for generating clean energy comprises partially oxidizing a hydrocarbon fuel and providing a partially oxidized gas stream, the partially oxidized gas stream comprising a volume quantity of hydrogen and a heat content from the chemical reactions involved in the oxidation of the hydrocarbon fuel. The partially oxidized gas stream is introduced to a heat engine or a plurality of heat engines, for example, operably coupled to a manifold. The heat engine generates an amount of clean energy from at least a portion of the heat content. The method further comprises separating hydrogen from the partially oxidized gas stream.

In one example, the partially oxidized gas stream is introduced directly to the heat engine without separation of gaseous components from the partially oxidized gas stream. The gaseous components from the partially oxidized gas stream exiting the heat engine can be separated and used for capturing and/or storing hydrogen and/or carbon dioxide.

In one example, additional system components can be employed to maximize the heat transfer of the system and to further generate clean energy. For example, the system can further comprise introducing the CO rich stream engine to an oxy combustor unit, wherein the oxy combustor is supplied with a source of essentially pure oxygen so as to provide a CO2 rich stream exiting the oxy-combustor unit at a temperature of at least 1000° C.

With reference to FIG. 1, a system 200 for generating clean energy is depicted, the system comprising a partial oxidation unit 210 configured to partially oxidize a hydrocarbon fuel 205, for example, natural gas, or methane and provide a hot gas mixture 212 of a partially oxidized gas stream comprising a volume amount of hydrogen and an volume amount of carbon monoxide (CO) therefrom. 5 gas mixture 212 comprises a majority volume of hydrogen and a remainder volume predominantly of carbon monoxide, water, carbon dioxide, and unreacted hydrocarbon.

Figure 2:
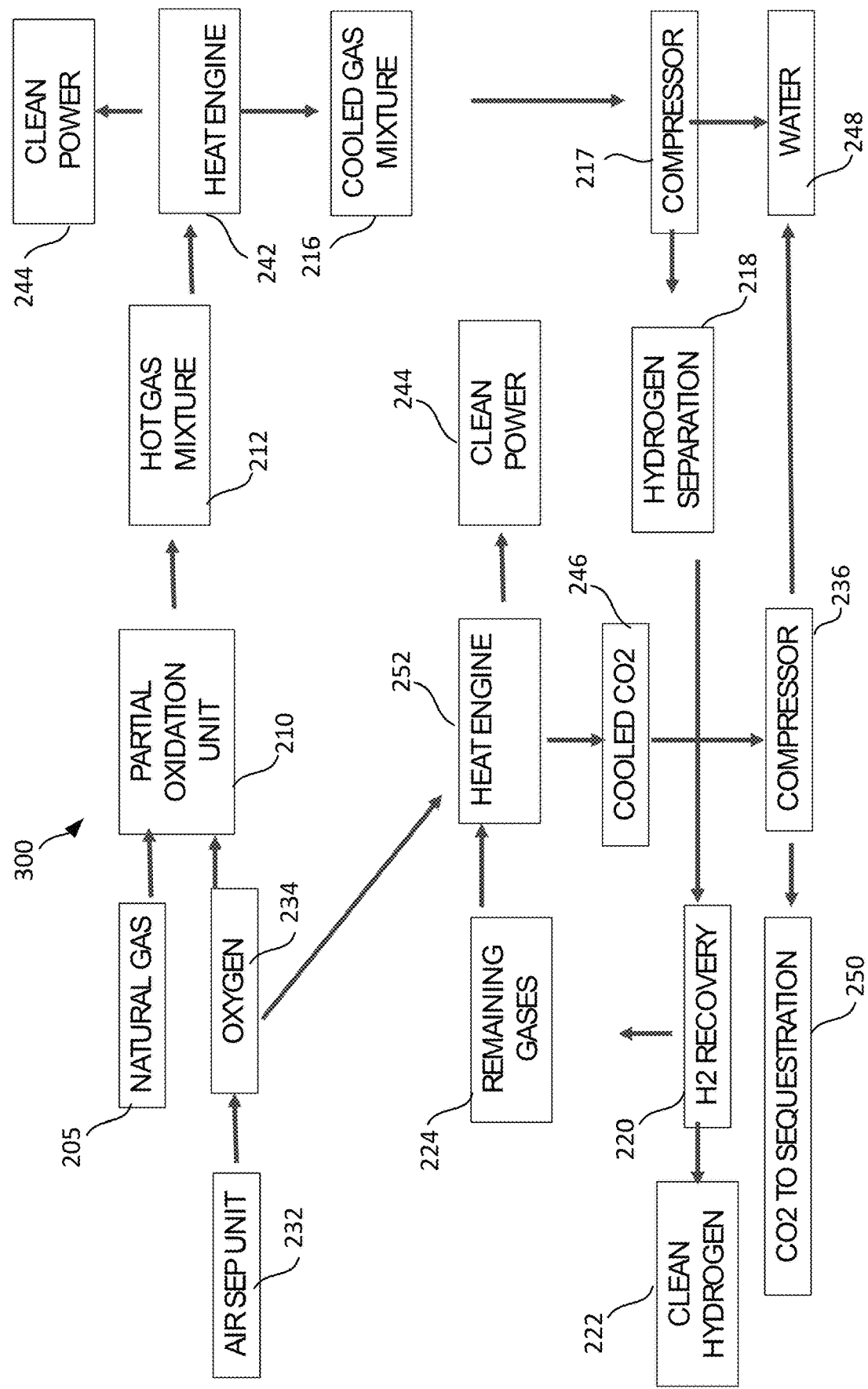
FIG. 2 is a schematic flow diagram of another presently disclosed method and system.

As shown in FIG. 1, air separator unit 232 (ASU) is operably coupled to the partial oxidation unit 210, the ASU 232 configured to provide a source of essentially pure oxygen 234 to the partial oxidation unit 210. In another example, as shown in FIG. 2, air separator unit 232 (ASU) is operably coupled to the partial oxidation unit 210 and additional heat engine 252, the ASU 232 configured to provide a source of essentially pure oxygen 234 to the partial oxidation unit 210 and the additional heat engine 252.

Referring again to FIG. 1, the hot gas mixture 212 comprising the partially oxidized gas stream is presented to at least one heat engine 242 providing clean power 244. In one example, heat engine 242 comprises a free piston engine or a Stirling engine. In one example, the free piston engine or the Stirling engine comprises at least one alternator. In one example, heat engine 242 is a linear generator. The linear generator can comprise a linear alternator.

In one example, the quantity of heat present in the hot gas mixture 212 is converted to an amount electrical energy using a linear alternator. In one example, heat engine 242 is configured to output up to about 200 kilowatts.

In one example, a plurality of heat engines 242 are used, each operably coupled to the hot gas mixture 212 comprising the partially oxidized gas stream, for example by way of a manifold (not shown). In one example, the partially oxidized gas stream is introduced directly to the manifold operably coupled to the plurality of heat engines. For example, the hot gas mixture 212 comprising the partially oxidized gas stream can be configured to flow directly into the manifold connecting a plurality of heat engines 242.

In one example, the partially oxidized gas stream is introduced directly to heat engine 242 or manifold at a temperature of between 1000-1600° C. In another example, the hot gas mixture 212 comprising the partially oxidized gas stream is introduced directly to heat engine 242 or manifold at a temperature of between 1000-1600° C. and between 3-10 bar-g. In another example, the partially oxidized gas stream is introduced directly to heat engine 242 or manifold at a temperature of about 1400° C. and about 5 bar-g. In one example, the partially oxidized gas stream exits from heat engine 242 at a temperature of less than 900° C. and at a pressure less than or equal to 2 bar-g. In one example, the partially oxidized gas stream exits from heat engine 242 at a temperature less than 500° C., 400° C., 300° C., 250° C., 200° C., 150° C., or less and more than 100° C., and at a pressure less than or equal to 2 bar-g. Heat engine 242 is configured to receive a heat content from the hot gas mixture 212 comprising the partially oxidized gas stream and to generate an amount of energy proportional to the heat content of the partially oxidized gas stream.

As shown in FIG. 1, heat engine 242 is operably coupled to compressor 217 which receives the cool the gas mixture 216 exiting the heat engine, which has been cooled due to heat exchange with the heat engine and the production of clean energy. Compressor 217 is configured to compress the cooled gas mixture 216 exiting the heat engine 242 and to introduce this gas stream to a gas separation unit 218. Gas separation unit 218 can be a pressure swing absorption unit or cryogenic separator. Water 248 present in the cooled gas mixture 216 can be removed prior to presenting the cooled gas mixture to the gas separation unit 218.

Exiting gas separator unit 218 is a clean H2 rich stream 222 that can be at least partially captured, stored in a hydrogen storage unit (not shown) for transporting as clean hydrogen 222. Also exiting gas separator unit 218 is remaining gases 224 of the cooled gas mixture 216. In one example, remaining gases 224 comprises a carbon monoxide rich stream and a remainder volume of carbon dioxide and methane in smaller volume proportions.

Again referring to FIG. 1, remaining gases 224 are presented to an oxy combustion unit 230, the oxy combustion unit 230 being operably coupled to the source of oxygen 234 from air separation unit 232. Oxy combustion unit 230 generates an essentially pure hot carbon dioxide stream 240 from the combustion of the remaining gases 224 with the source of oxygen 234. In one example of the essentially pure hot carbon dioxide stream 240 is provided at a temperature of between 1000-1600° C. Hot carbon dioxide stream 240 is introduced to an additional heat engine 252, or manifold connecting a plurality of heat engines (not shown), at a temperature of between 1000-1600° C. and between 3-10 bar-g. In another example, hot carbon dioxide stream 240 is introduced directly to additional heat engine 252 or manifold at a temperature of about 1400° C. and about 5 bar-g. In one example, the hot carbon dioxide stream 240 stream exits from additional heat engine 252 at a temperature of less than 900° C. and at a pressure less than or equal to 2 bar-g as cooled carbon dioxide stream 246. In one example, the cooled carbon dioxide stream 246 exits from additional heat engine 252 at a temperature less than 500° C., less than 400° C., less than 300° C., less than 250° C., less than 200° C., less than 150° C., or less than 100° C., and at a pressure less than or equal to 2 bar-g. Additional heat engine 252 is configured to receive a heat content from the hot carbon dioxide stream 240 and to generate an amount of energy proportional to the heat content of the hot carbon dioxide stream 240.

In one example, a heat and mass balance of the presently disclosed method and system will generate more power than is needed for operation of an air separation unit (ASU) 123 to provide the oxygen used in a POX unit 210, plus the power needed by a compressor 217 used to recover clean hydrogen 220, and the power needed in the CO2 compressor 236 for CO2 sequestration. The hydrogen generated by the presently disclosed method and system will be clean and without CO2 emissions. The net power generated and sold by the presently disclosed method and system will be clean with no CO2 emissions. Also, the nitrogen and argon produced in the ASU by the presently disclosed method and system will be without CO2 emissions and can also be sold.

In one example, the methods and system can comprise passing the CO2 gas through one or more compressors 236 (e.g., pumps) to pressurize the CO2 gas to a pressure of at least about 8 MPa or 80 bar-g. This further may comprise passing the CO2 gas through a series of at least two compressors to pressurize the CO2 circulating fluid stream. In certain embodiments, the CO2 gas can be pressurized to a pressure of at least about 15 MPa or 150 bar-g. Even further pressure ranges may be desirable, as otherwise described herein. In other examples, the pressurized CO2 gas specifically can be provided in a supercritical fluid state. In some examples, at least a portion of the CO2 in the pressurized CO2 gas can be introduced into a pressurized pipeline for sequestration (or other disposal, as discussed herein).

Expanding a supercritical CO2 stream purified of combustion products and recycled CO2 rich fluid as presently disclosed in a turbine with production of shaft power, can be performed by expanding to a pressure that is above about 2 MPa or 20 bar-g, and is below the pressure at which a CO2 liquid phase appears. In one example the fluid is cooled to a temperature near ambient temperature to about 7-8 MPa or 70-80 bar-g.

When comparing the net energy in the natural gas fuel to the sum of the energy in the hydrogen produced and the net generation of electric power, the overall thermal efficiency of the system is typically at or above about 50% to about 70% gain in power. In one example, the presently disclosed method provides for providing such net gain of power to a direct reduction iron process, an oil-gas refinery, etc. In one example, the presently disclosed method is coupled to a process that provides a source of hydrocarbon fuel and means for H2 capture/storage and CO2 sequestration, such as an oil-gas refinery, natural gas recovery systems, etc.

In one example, the presently disclosed method and system provides a H2 production capacity of about 1 metric tons/hour, about 1.2 metric tons/hour, about 1.5 metric tons/hour, or about 2 metric tons/hour or more, based on a hydrocarbon fuel consumption of about 400 million BTU/ hour.

In one example, the presently disclosed method and system provides a CO2 sequestering rate of about 10 metric tons/hour, about 15 metric tons/hour, about 20 metric tons/ hour, or about 25 metric tons/hour or more, based on a hydrocarbon fuel consumption of about 400 million BTU/ hour. In one example, the presently disclosed method and system provides a CO2 sequestering rate of about 10 metric tons/hour, about 15 metric tons/hour, about 20 metric tons/ hour, or about 25 metric tons/hour or more, based on a hydrocarbon fuel consumption of about 400 million BTU/ hour and oxygen separated from air of about 15-25 short tons/hour.

In one example, the presently disclosed method provides clean power of about 10 megawatts, about 15 megawatts, about 20 megawatts, or about 25 megawatts or more, based on a hydrocarbon fuel consumption of about 400 million BTU/hour.

With reference to the Figures, FIGS. 1 and 2 collectively, schematically depict the presently disclosed method and system 200, 300, respectively, where hydrocarbon fuel 205 is partially oxidized in POX unit 210 and provides a hot gas mixture 212 comprising the partially oxidized gases, the hot gas mixture 212 comprising predominately hydrogen and carbon monoxide (CO). The temperature of the combustion gas stream leaving the POX is between 1,000 C and 1,600 C and typically 1,400 C., at 2 bar-g to 10 bar-g.

In one example, the hydrocarbon fuel 205 is natural gas, e.g., methane (CH4), or liquefied propane (LNP). In one example, the method is a configured as a partially closed loop process. In one example, the method is a configured as a closed loop process.

Hydrogen, carbon monoxide, and carbon dioxide (H2/ CO/CO2) present in the cooled gas mixture 216 exiting heat engine 242 can be separated in separator unit 218. Separation of hydrogen can be performed in a number of ways, including, cryogenic cooling and/or distillation, selective membrane adsorption, or pressure swing adsorption. Separation of CO from CO2 in the remainder volume of the cooled gas mixture 216 can be performed in a number of ways, including, cryogenic cooling and/or distillation, selective membrane adsorption, pressure swing adsorption using porous molecular crystals (PMC), potassium carbonate solution to absorb carbon dioxide, or using high pressure water, or using hydrochloric acid or ammoniacal solutions with subsequent desorption of the separated CO from the solution using heat or vacuum. In one example, ammonia a refrigerant in a heat exchange to liquify the CO2 of the combined CO and CO2 stream, and provide for separation of the CO stream. Separation of H2 from CO/CO2 can be carried out concurrently or in a sequence of separation steps.

In one example, CO2 separated from the cooled gas mixture 216 is compressed using compressor 236 for sequestration 250. The source of CO2 gas is a liquid, a gas, in a supercritical state, or combination.

While certain embodiments of the present disclosure have been illustrated with reference to specific combinations of elements, various other combinations may also be provided without departing from the teachings of the present disclosure. Thus, the present disclosure should not be construed as being limited to the particular exemplary embodiments described herein and illustrated in the Figures, but may also encompass combinations of elements of the various illustrated embodiments and aspects thereof.

I claim:

1. A method for generating energy, the method comprising:
   partially oxidizing a hydrocarbon fuel and providing a partially oxidized gas stream, the partially oxidized gas stream comprising a volume quantity of hydrogen and a heat content;
   introducing the partially oxidized gas stream to a heat engine;
   at least partially separating hydrogen from the partially oxidized gas stream exiting the heat engine; and
   generating an amount of energy from at least a portion of the heat content.

2. The method of claim 1, wherein the partially oxidized gas stream further comprises a remainder volume quantity, the remainder volume quantity corresponding to a volume quantity of gas present in the partially oxidized gas stream other than the volume quantity of hydrogen.

3. The method of claim 2, wherein the volume quantity of hydrogen is in excess relative to the remainder volume quantity in the partially oxidized gas stream.

4. The method of claim 1, wherein the partially oxidized gas stream is introduced directly to the heat engine.

5. The method of claim 1, wherein the partially oxidized gas stream is introduced directly to the heat engine at a temperature of between 1000-1600° C.

6. The method of claim 1, wherein the partially oxidized gas stream is introduced directly to the heat engine at a temperature of between 1000-1600° C. and between 3-10 bar-g.

7. The method of claim 1, further comprising compressing the partially oxidized gas stream exiting the heat engine.

8. The method of claim 1, further comprising at least partially collecting and/or storing the hydrogen separated from the partially oxidized gas stream exiting the heat engine.

9. The method of claim 1, further comprising sequestering at least a portion carbon dioxide from the partially oxidized gas stream.

10. A system for generating energy, the system comprising:
- a partial oxidation unit (POX) configured to partially oxidize a hydrocarbon fuel and provide a partially oxidized gas stream comprising a volume amount of hydrogen and an amount of carbon monoxide (CO) therefrom; and
- a heat engine operably coupled to the partial oxidation unit, the heat engine configured to receive a heat content from the partially oxidized gas stream and to generate an amount of energy proportional to the heat content received from the partially oxidized gas stream; and
- a gas separator operatively coupled to the heat engine, gas separator configured to receive the partially oxidized gas stream exiting the heat engine, the gas separator configured to separate the hydrogen from the partially oxidized gas stream and provide a hydrogen rich stream and a carbon monoxide rich stream.

11. The system of claim 10, wherein the heat engine comprises a free piston engine or a Stirling engine or linear generator.

12. The system of claim 10, further comprising at least one additional heat engine configured to receive the essentially pure oxygen and the carbon monoxide rich stream.

13. The system of claim 10, further comprising an oxy-combustor unit operably configured to receive the carbon monoxide rich stream wherein the oxy-combustor unit is coupled with the source of essentially pure oxygen, wherein the oxy-combustor unit is configured to combust at least a portion of the carbon monoxide rich stream and exit a high temperature rich carbon dioxide stream having a heat content.

14. A method of generating power, the method comprising the steps of:
- partially oxidizing a hydrocarbon fuel with O2 (oxygen) to provide a partially oxidized product stream comprising H2 (hydrogen), CO (carbon monoxide), water with trace amounts of CO2 (carbon dioxide), the partially oxidized product stream having a heat content;
- introducing the partially oxidized gas stream to at least one heat engine;
- separating the H2 from the partially oxidized gas stream exiting the heat engine and providing a hydrogen rich stream and a CO rich stream; and
- generating power from the heat engine using at least some of the heat content from the partially oxidizing gas stream.

15. The method of claim 14, further comprising capturing and/or storing the hydrogen rich stream.

16. The method of claim 14, further comprising oxidizing the CO rich stream with essentially pure oxygen and providing a rich CO2 stream.

17. The method of claim 16, further comprising sequestering the rich CO2 stream.

* * * * *